US012179975B2

(12) United States Patent
Lohmann et al.

(10) Patent No.: US 12,179,975 B2
(45) Date of Patent: Dec. 31, 2024

(54) CLOSURE FOR A BOTTLE

(71) Applicant: Kultique GmbH, Tiefgraben (AT)

(72) Inventors: Andrea Lohmann, Forstau (AT); Tom Trebert, Tiefgraben (AT)

(73) Assignee: Kultique GmbH, Tiefgraben (AT)

( * ) Notice: Subject to any disclaimer, the term of this patent is extended or adjusted under 35 U.S.C. 154(b) by 0 days.

(21) Appl. No.: 18/430,195

(22) Filed: Feb. 1, 2024

(65) Prior Publication Data

US 2024/0166412 A1 May 23, 2024

Related U.S. Application Data

(63) Continuation of application No. PCT/EP2021/071541, filed on Aug. 2, 2021.

(51) Int. Cl.

| | |
|---|---|
| ***B65D 51/24*** | (2006.01) |
| ***A47G 19/22*** | (2006.01) |
| ***B65D 39/10*** | (2006.01) |
| ***F21S 9/02*** | (2006.01) |
| ***F21V 23/04*** | (2006.01) |
| ***F21Y 115/10*** | (2016.01) |

(52) U.S. Cl.

CPC ........ *B65D 51/248* (2013.01); *A47G 19/2227* (2013.01); *B65D 39/10* (2013.01); *B65D 51/242* (2013.01); *F21S 9/02* (2013.01); *F21V 23/04* (2013.01); *A47G 2019/2238* (2013.01); *F21Y 2115/10* (2016.08)

(58) Field of Classification Search

CPC ........ A47G 19/2227; A47G 2019/2238; B65D 39/10; B65D 51/242; F21S 9/02; F21V 23/04

USPC .......................................................... 362/101

See application file for complete search history.

(56) References Cited

U.S. PATENT DOCUMENTS

| | | | | |
|---|---|---|---|---|
| 9,182,090 | B2 | 11/2015 | Muehlemann et al. | |
| 9,322,520 | B1 * | 4/2016 | Li | F21V 17/12 |
| 2012/0134143 | A1 * | 5/2012 | Lederer | F21S 9/037 362/183 |
| 2018/0152776 | A1 | 5/2018 | Lee | |
| 2018/0327154 | A1 | 11/2018 | Solan | |

FOREIGN PATENT DOCUMENTS

| | | | |
|---|---|---|---|
| DE | 202008001443 | U1 | 8/2008 |
| DE | 202008004030 | U1 | 8/2009 |

OTHER PUBLICATIONS

International Search Report with English translation in PCT/EP2021/071541, mailed May 18, 2022, 5 pages.

* cited by examiner

*Primary Examiner* — Laura K Tso

(74) *Attorney, Agent, or Firm* — Edell, Shapiro & Finnan, LLC

(57) ABSTRACT

A closure for a bottle for storing a drinking liquid includes at least one closure body and a lamp that is detachably connected to the closure body. At least part of the lamp can be inserted into a cavity of the closure body. Optionally, the lamp can be replaced by an insert without an illuminant.

20 Claims, 5 Drawing Sheets

100
101
102
103

200
201
202
203
204

300
301

300
600
500
204
203

200
201

101
102
400
100

CLOSURE FOR A BOTTLE

CROSS REFERENCE TO RELATED APPLICATIONS

This application is a continuation of International Application No. PCT/EP2021/071541, filed on Aug. 2, 2021, the entire contents of which are hereby incorporated by reference.

TECHNICAL FIELD

The present disclosure relates to a closure for a bottle and to an arrangement comprising such a closure and a bottle.

BACKGROUND

For some years now, increasing attention has been paid to reducing single-use packaging. This also means that drinking liquids are increasingly being stored in reusable containers in order to reduce waste production. A use of cups, glasses, and mugs at home or at work is not a problem. If the drinking liquid is however to be transported, for example, to school or on excursions and vacations, it must be stored in a leak-proof container.

Bottles, sometimes also mugs, which can be closed by a closure, have become established for this purpose. These reusable bottles and/or mugs are widely known and can be purchased on the market in many different shapes and sizes. The purchase of such a bottle is expensive and the bottles require considerable space, especially because they are not thrown away when the drinking liquid has been consumed. The closure, which is needed to transport the drinking liquid safely, has so far brought no additional benefit. On the contrary, it actually weighs down the bottle and makes it more unwieldy. Using it solely as a closure is therefore disadvantageous.

Solutions available on the market to date with a secondary use, such as a lamp, have the disadvantage that the closure cannot be used if the lamp needs to be charged or the closure needs to be thrown away if the lamp is defective. Such closures are known, for example, from CN 108 497 871 A.

SUMMARY

The disclosure relates to a closure for a bottle which overcomes the disadvantages of a conventional closure and, in addition to a new benefit for the closure, opens up flexible applicability of the closure. Furthermore, an arrangement with such a closure and a bottle is disclosed.

According to one aspect, a closure comprises a closure body and a lamp. The lamp is detachably connected to the closure body. In the context of this description, this is understood in particular to mean that the lamp can be detached from and reconnected to the closure body several times in a non-destructive and tool-free manner.

According to one implementation, at least a part of the lamp can be introduced as an insert in a cavity of the closure body. It is also possible that the entire lamp is introduced as an insert in the cavity. By way of example, the cavity can extend from one end of the closure body to an opposite end, so that the cavity is a free continuous opening of the closure body. This cavity can, for example, be closed by the lamp or the part of the lamp when the lamp is connected to the closure body.

According to another aspect, the closure may comprise a bracket having a first end and a second end. The closure body may comprise a first opening and a second opening. The lamp may have a first recess and a second recess. The recesses may, for example, correspond to the ends of the bracket. This can, in particular, mean that the ends of the bracket can protrude into the recesses at the same time. The bracket can protrude with its first end through the first opening into the first recess and at the same time with its second end through the second opening into the second recess. In this way, the lamp can be held securely on the closure body. When the lamp is removed from the closure body, the first end of the bracket can protrude through the first opening into the cavity and the second end of the bracket can protrude through the second opening into the cavity.

It is moreover provided that the bracket has a substantially U-shaped form, wherein the first and second ends of the bracket are bent inwards at 90° angles. By way of example, the bracket may comprise a central region, which is respectively adjoined by two outer regions. The outer areas can extend substantially perpendicular relative to the middle area. One of the ends can respectively connect to one of the outer areas. In turn, the ends can be arranged substantially parallel to the central area, in particular without offset in the longitudinal direction of the central area relative to the central area. The longitudinal direction of the central area is understood to be the direction in which the central area has its greatest extent.

There is the possibility that the recesses are each formed by a longitudinal slot, the first end of which is open and the second end of which is adjoined at a right angle by a transverse slot, which slot is shorter than the longitudinal slot.

It may be provided that the ends of the bracket and the recesses of the lamp engage in the manner of a bayonet fitting. In this context, a bayonet fitting is understood to be a mechanical connection between two cylindrical parts that can be quickly established and released. The parts are connected and disconnected by pushing them together and turning them in opposite directions.

It is possible that the closure body comprises an external thread.

It may be provided that the lamp comprises at least a bottom part of the lamp, a top part of the lamp, a seal, an energy storage device and an illuminant.

Furthermore, there is the possibility that the illuminant is integrated into the top part of the lamp.

It may moreover be provided that the illuminant comprises at least one light-emitting diode.

It may advantageously be provided that the energy storage device can be charged via a charging connection, preferably a USB charging connection.

There exists the possibility that the bottom part of the lamp comprises the charging connection and/or the energy storage device.

It is furthermore advantageous if the illuminant can be switched on and/or off by touching the lamp and/or a light intensity can be adjusted by touch.

It may be provided that the lamp can be replaced by an insert without an illuminant. The insert can then, in cooperation with the closure body, close the bottle in a liquid-tight manner when the lamp has been removed in order to charge it. This can be advantageous, for example, if the lamp is being charged but the bottle is to be used to transport a drink. For this purpose, it is possible that the insert without illuminant is made of bamboo.

Alternatively, for example, a second lamp can be detachably connected to the closure body without tools. In this case, the bottle continues to fulfill all functions, even though a lamp is being charged.

According to another aspect, an arrangement comprises the closure and the bottle. The bottle comprises an opening which can be closed, preferably liquid-tight, by the closure.

According to one implementation, the arrangement may comprise the insert without illuminant.

According to another implementation, the insert may comprise a third and a fourth recesses. The bracket can protrude with its first end through the first opening into the third recess and with its second end through the second opening into the fourth recess when the insert is connected to the closure body. The connection of the insert to the closure body via the bracket can, for example, be similar or the same as the connection of the lamp to the closure body.

It may moreover be provided that a seal is provided between the closure and the bottle when the opening of the bottle is closed by the closure.

The possibility exists that the bottle comprises an internal thread into which the external thread of the closure can be screwed.

There is the possibility for the bottle to advantageously be double-walled with an inner bottle and an outer bottle.

It may further be provided that the inner bottle and/or the outer bottle are made of stainless steel.

According to another aspect, the lamp comprises a first recess and a second recess. The recesses are arranged opposite each other on a circular circumference of the lamp. The recesses each comprise a longitudinal slot and a transverse slot extending at a right angle to the longitudinal slot and adjoining the longitudinal slot. The longitudinal slot respectively comprises an open end. In the context of this description, an open end means, in particular, that the longitudinal slot has no wall at this end. This end with no wall is an end that limits the longitudinal slot in its longitudinal direction. In the context of this description, the longitudinal direction is understood to be the direction of the longitudinal slot in which it has its longest extension. By way of example, an end of a bracket can be inserted into the longitudinal slot via the open end. The end of the bracket can thereinafter be inserted into the transverse slot by rotating the lamp relative to the closure body.

According to another aspect, the lamp can comprise a magnet. This is advantageous for using the lamp individually without the closure body and the bottle. The magnet can then be used to attach the lamp easily and quickly to a metal object, such as a tent pole or a body part of a motor vehicle.

According to another aspect, the insert is devoid of illuminants. The insert comprises a third and a fourth recess. The recesses are arranged opposite each other on a circular circumference of the insert. The recesses respectively comprise one longitudinal slot and one transverse slot extending at a right angle to the longitudinal slot and adjoining the longitudinal slot, wherein the longitudinal slot respectively comprises one open end. By way of example, it is therefore possible that an end of a bracket can be inserted into the longitudinal slot via the open end. Thereinafter, the end of the bracket can be inserted into the transverse slot by rotating the insert relative to the closure body.

According to another aspect, a modular system comprises an arrangement according to an implementation, a plurality of lamps according to an implementation and a plurality of inserts according to an implementation. In the context of this description, a modular system is understood in particular to be a system in which several components are interchangeable. By way of example, a user can therefore use different lamps and/or inserts in a closure according to one implementation. If, for example, the user does not need a lamp, they use a first insert. This can be replaced, for example, by an insert of a different color. On the other hand, if the user needs a lamp, they can replace the insert with the lamp. This results in an extremely flexible modular system, in which the user can select their preferred components.

BRIEF DESCRIPTION OF THE DRAWINGS

Further features and advantages of examples of the closure for a a bottle are described below with reference to the drawings. The same reference signs are used for identical or similar parts and for parts with identical or similar functions.

DETAILED DESCRIPTION

Figures 1, 2, 3:
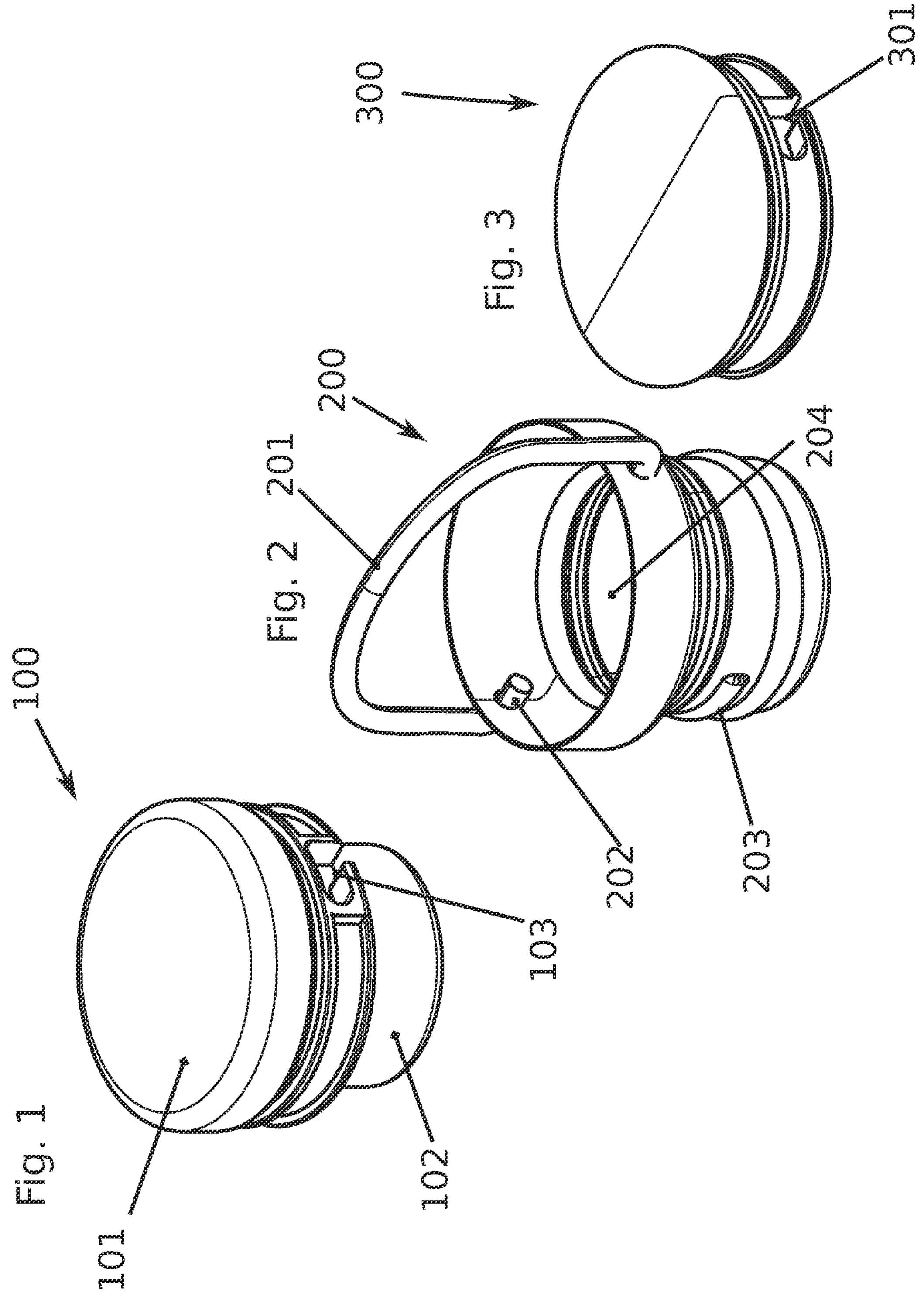
FIG. 1 shows a schematic perspective view of a lamp according to a disclosed implementation.
FIG. 2 shows a schematic perspective view of a closure body with a bracket attached thereto according a disclosed implementation.
FIG. 3 shows a schematic perspective view of an insert without illuminant according to a disclosed implementation.

It is not necessary for a device according to the disclosure to have all the features described below. It is also possible for a device according to the disclosure to have only individual features of the examples described below.

FIGS. 1, 4, 7, 9, and 10 illustrate a lamp 100 comprising a top part of the lamp 101 with an illuminant and a bottom part of the lamp 102, in which, for example, an energy storage device such as a rechargeable battery and/or a charging connection can be arranged. In addition, the lamp 100 comprises a first recess 103 and a second recess 400.

Figures 4, 5, 6:
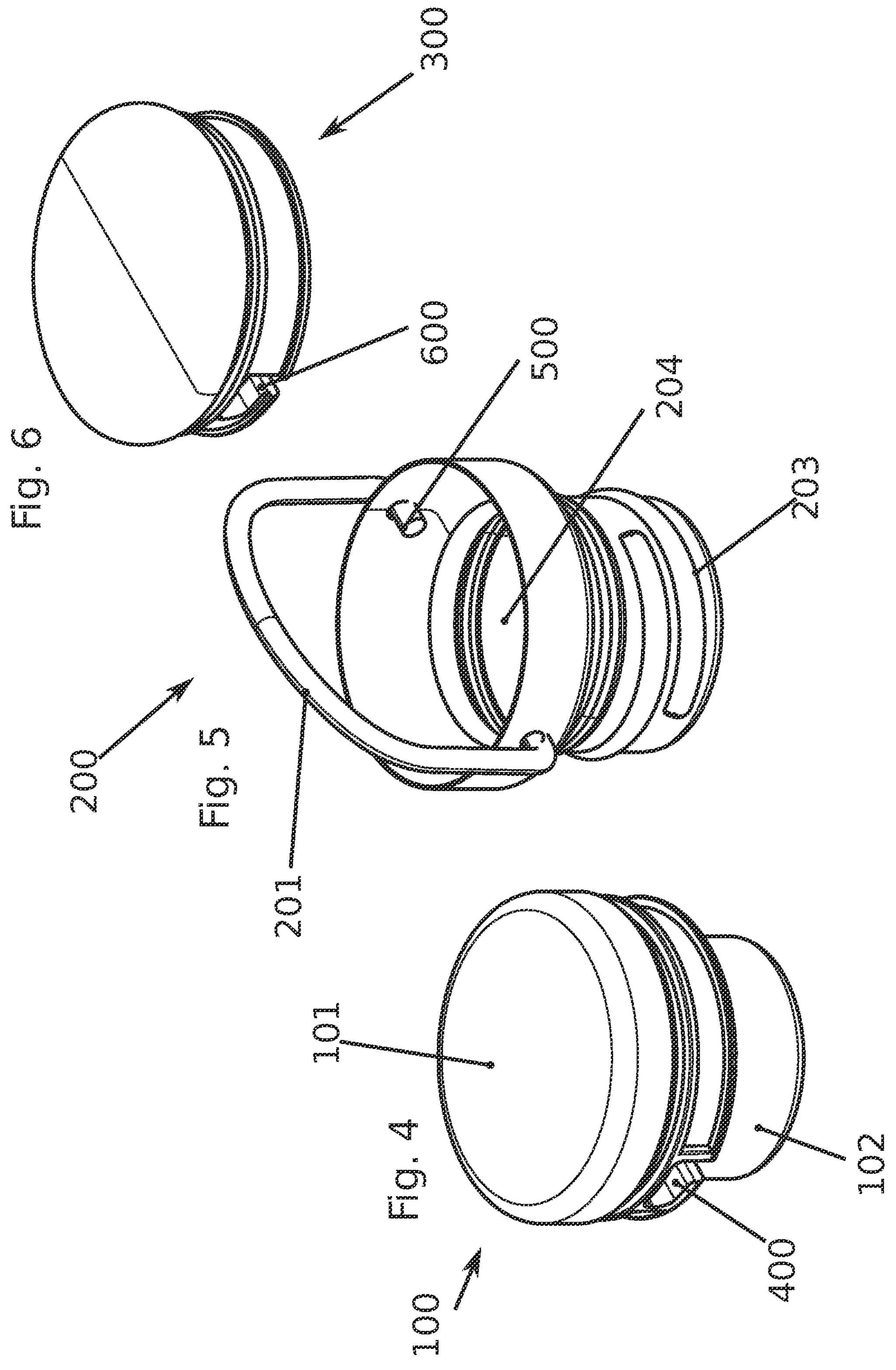
FIG. 4 shows a schematic perspective view of the lamp shown in FIG. 1.
FIG. 5 shows a schematic perspective view of the closure body shown in FIG. 2.
FIG. 6 shows a schematic perspective view of the insert of FIG. 3.

The closure body 200 comprises two opposing openings through which the ends 202 and 500 of a bracket 201 protrude (see FIGS. 2 and 5). The closure body moreover comprises a cavity 204 in the form of a through opening and an external thread 203. The external thread 203 can be screwed into an internal thread of a bottle 900 (FIG. 9) in order to close the bottle 900.

Figure 8:
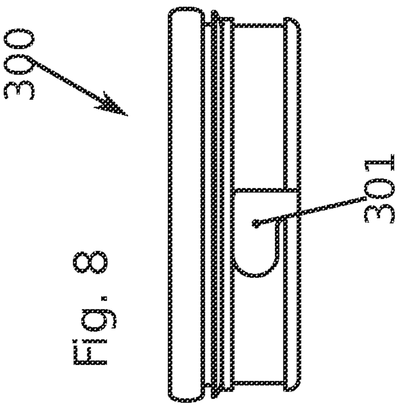
FIG. 8 shows a schematic side view of the insert shown in FIG. 3.

As shown in FIGS. 3, 6, and 8, an insert 300 comprises a third recess 301 and a fourth recess 600.

Both the lamp 100 as well as the insert 300 can be introduced into the cavity 204 of the closure body 200 and close it in a liquid-tight manner. For this purpose, when the lamp 100 is to be used and when the closure is used as intended, the ends 202 and 500 of the bracket 201 are introduced into the recesses 103 and 400 by moving the lamp 100 relative to the closure body 200 in a vertical direction. Thereinafter, the lamp 100 is rotated in a horizontal plane relative to the closure body 200. In this way, the ends 202 and 500 of the bracket 201 reach the end of the recesses 103 and 400, as in the case of a bayonet fitting, so that the lamp 100 is reliably held in the closure body 200. A reverse movement allows the lamp 100 to once again be released from the closure body 200, for example to recharge it.

The insert 300 can be connected to and disconnected from the closure body 200 in the same way. Recesses 301 and 600 take the place of recesses 103 and 400, and the shape of recesses 301 and 600 is identical to the shape of recesses 103 and 400.

A user can thus connect and disconnect the lamp 100 and the insert 300 to and from the closure body 200 in a particularly easy manner. This is advantageous if the closure is to be used but the lamp 100 needs to be charged. A user can moreover use another identical lamp so that a charged lamp is always available. It is also possible for the user to have several different inserts 300 so that they can, for example, vary the color.

Figure 7:
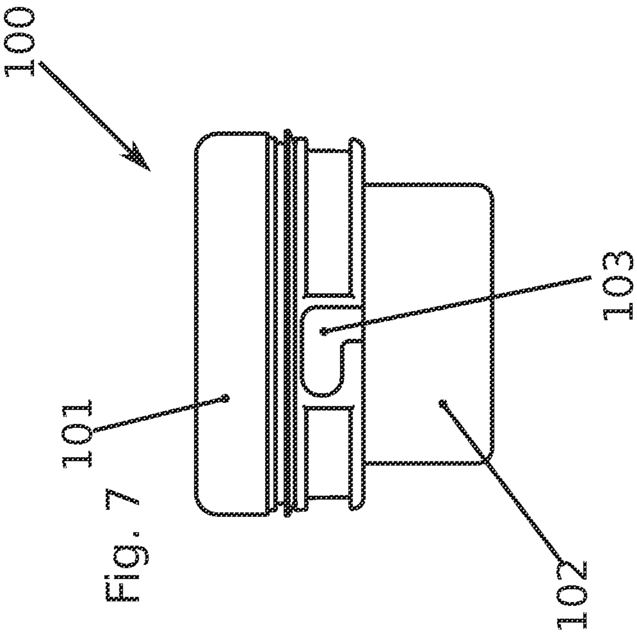
FIG. 7 shows a schematic side view of the lamp shown in FIG. 1.

The form of the recesses 301 and 103 can be recognized particularly well in FIG. 7 and FIG. 8. It should be noted that the recesses 400 and 600 likewise have the same form. The recesses 103 and 301 are respectively a longitudinal slot which extends in a vertical direction when used as intended and to which longitudinal slot is connected a transverse slot which extends in a horizontal direction when used as intended.

The longitudinal slot comprises an end that is open at the bottom during intended use, through which the respective end 202 or alternatively 500 of the bracket 201 can be inserted into the respective recess 103 or alternatively 301. When the lamp 100 or alternatively the insert 300 is rotated relative to the closure body 200, the respective end 202 or alternatively 500 of the bracket 201 then reaches a wall bounding the transverse slot, so that the lamp 100 or alternatively the insert 300 is connected to the closure body 200.

Figure 9:
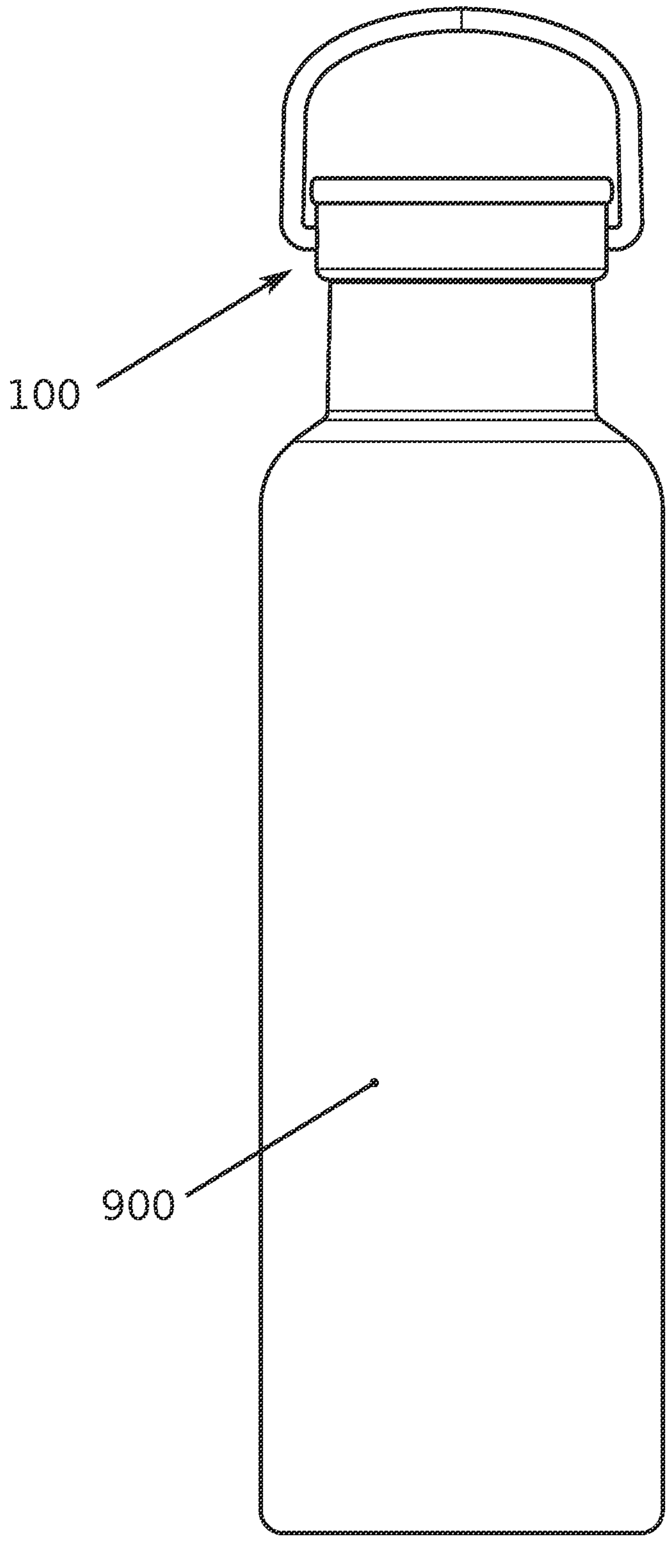
FIG. 9 shows a schematic view of an arrangement according to a disclosed implementation comprising a bottle and a closure closing the bottle.

The bottle 900 shown in FIG. 9 is closed with a closure in which the lamp 100 is connected to the closure body 200. However, the bottle can also be closed with a closure in which the insert 300 is connected to the closure body 200.

Figure 10:
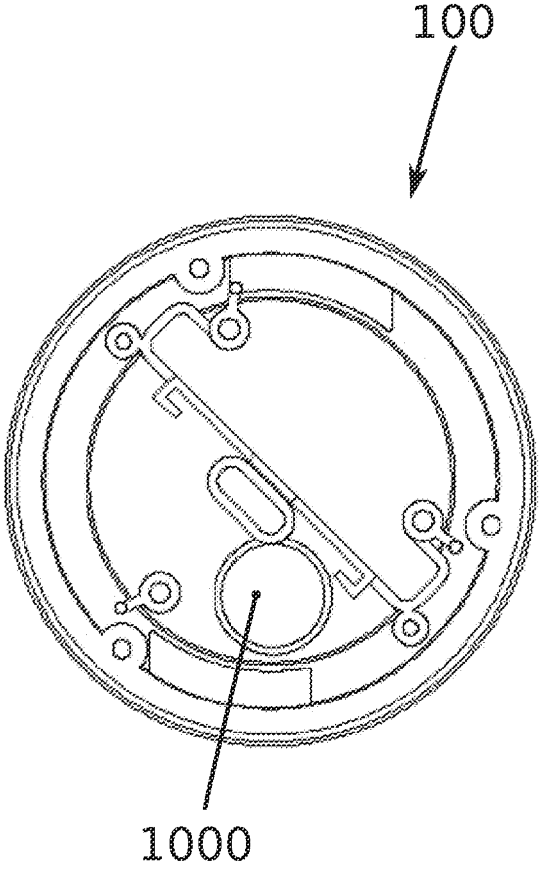
FIG. 10 shows a schematic cross-sectional view of a lamp according to a disclosed implementation.

FIG. 10 shows that the lamp 100 comprises a magnet 1000. The magnet 1000 can be used to attach the lamp 100 to a metal object such as a tent pole or a body part of a motor vehicle when it is detached from the closure body and used individually.

What is claimed is:

1. A closure for a bottle for storing a drinking liquid, comprising:
- a closure body comprising a first opening and a second opening;
- a lamp detachably connected to the closure body and comprising a first recess and a second recess; and
- a bracket with a first end and a second end, the bracket projecting with its first end through the first opening into the first recess and with its second end through the second opening into the second recess.

2. The closure of claim 1, wherein at least a part of the lamp is an insert into a cavity of the closure body.

3. The closure of claim 1, wherein the bracket has a substantially U-shaped form, and the first end and the second end of the bracket are respectively bent inwards at 90°.

4. The closure of claim 1, wherein the first and second ends of the bracket respectively engage the first and second recesses of the lamp in the manner of a bayonet fitting.

5. The closure of claim 1, wherein the closure body comprises an external thread.

6. The closure of claim 1, wherein the lamp comprises at least a bottom part, a top part, an energy storage device, and an illuminant.

7. The closure of claim 6, wherein the illuminant is integrated into the top part of the lamp.

8. The closure of claim 6, wherein the illuminant comprises at least one light-emitting diode.

9. The closure of claim 6, wherein the energy storage device is chargeable via a charging connection.

10. The closure of claim 9, wherein the bottom part of the lamp comprises the charging connection or the energy storage device or both the charging connection and the energy storage device.

11. The closure of claim 6, wherein the illuminant can be switched on and/or off and/or a light intensity can be adjusted by touching the lamp.

12. The closure of claim 1, wherein the lamp is replaceable with an insert without an illuminant.

13. An arrangement comprising:
- the closure of claim 1; and
- the bottle, wherein the bottle comprises an opening closeable by the closure.

14. The arrangement of claim 13, further comprising:
- an insert without an illuminant, the insert being capable of replacing the lamp.

15. The arrangement of claim 14, wherein:
- the insert comprises a third recess and a fourth recess; and
- the bracket protrudes with its first end through the first opening into the third recess and with its second end through the second opening into the fourth recess when the insert is connected to the closure body.

16. The arrangement of claim 13, wherein the bottle comprises an internal thread into which an external thread of the closure can be screwed.

17. The arrangement of claim 13, wherein the bottle is double-walled with an inner bottle and an outer bottle.

18. A lamp for insertion into the closure body of the closure of claim 1, comprising:
- first and second recesses arranged opposite each other on a circular circumference of the lamp, each of the first and second recesses comprising a longitudinal slot and a transverse slot extending at a right angle to the longitudinal slot and adjoining the longitudinal slot, wherein the longitudinal slot respectively comprises an open end.

19. The lamp of claim 18, further comprising a magnet connected to a surface of the lamp.

20. An insert for the closure body of the closure of claim 1, comprising:
- third and fourth recesses arranged opposite each other on a circular circumference of the insert, each of the third and fourth recesses comprising a longitudinal slot and a transverse slot extending at a right angle to the longitudinal slot and adjoining the longitudinal slot, wherein the longitudinal slot respectively comprises an open end, wherein the insert is devoid of illuminants.

* * * * *